United States Patent
Xu et al.

(10) Patent No.: US 11,516,809 B2
(45) Date of Patent: Nov. 29, 2022

(54) ELECTRONIC APPARATUS, WIRELESS COMMUNICATION METHOD AND COMPUTER-READABLE MEDIUM FOR MEASUREMENTS BASED ON ADJUSTED BEAM CONFIGURATIONS

(71) Applicant: Sony Group Corporation, Tokyo (JP)

(72) Inventors: Wei Xu, Jiangsu (CN); Yucheng Wang, Jiangsu (CN); Wenbo Zhang, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/283,023

(22) PCT Filed: Oct. 31, 2019

(86) PCT No.: PCT/CN2019/114743
§ 371 (c)(1),
(2) Date: Apr. 6, 2021

(87) PCT Pub. No.: WO2020/093929
PCT Pub. Date: May 14, 2020

(65) Prior Publication Data
US 2021/0345316 A1    Nov. 4, 2021

(30) Foreign Application Priority Data
Nov. 7, 2018    (CN) .......................... 201811318599.8

(51) Int. Cl.
*H04W 72/04*    (2009.01)
*H04W 4/02*    (2018.01)
(Continued)

(52) U.S. Cl.
CPC ......... *H04W 72/048* (2013.01); *H04W 4/023* (2013.01); *H04W 16/28* (2013.01);
(Continued)

(58) Field of Classification Search
CPC ... H04B 7/18578; H04L 5/0048; H04W 16/28
See application file for complete search history.

(56) References Cited

U.S. PATENT DOCUMENTS 9,489,813 B1 * 11/2016 Beigel ...................... G01S 5/00
2017/0325221 A1 * 11/2017 Jalali ..................... H04W 16/28
(Continued)

FOREIGN PATENT DOCUMENTS

| CN | 1744763 A | 3/2006 |
| CN | 1753550 A | 3/2006 |

(Continued)

OTHER PUBLICATIONS

H. Nakajo and T. Fujii, "Local 5G mmWave Signal Measurement and Analysis for Spectrum Database," 2021 Twelfth International Conference on Ubiquitous and Future Networks (ICUFN), 2021, pp. 350-355, doi: 10.1109/ICUFN49451.2021.9528539. (Year: 2021).*

(Continued)

*Primary Examiner* — William D Cumming
(74) *Attorney, Agent, or Firm* — Xsensus LLP

(57) ABSTRACT

An electronic apparatus, and a corresponding wireless communication method and computer-readable medium, where the electronic apparatus for wireless communication includes a processing circuit which is configured to: determine a first position range of a user equipment on the basis of first measurement information from the user equipment and regarding first beam scanning; when the first position range is lower than a predetermined accuracy requirement, determine adjustment of a beam configuration on the basis of the first position range; and determine a second position range of the user equipment on the basis of second measurement information from the user equipment and regarding second beam scanning performed by means of the adjusted beam configuration.

17 Claims, 16 Drawing Sheets

(51) Int. Cl.
*H04W 16/28* (2009.01)
*H04W 24/10* (2009.01)
*H04W 64/00* (2009.01)

(52) U.S. Cl.
CPC ......... *H04W 24/10* (2013.01); *H04W 64/006* (2013.01); *H04W 72/046* (2013.01)

(56) References Cited

U.S. PATENT DOCUMENTS

2021/0345316 A1* 11/2021 Xu .................. G01S 5/0205
2021/0352593 A1* 11/2021 Zhang .............. H04L 5/0048

FOREIGN PATENT DOCUMENTS

| CN | 103984971 A | 8/2014 | |
| CN | 106130617 A | 11/2016 | |
| CN | 108169710 A | 6/2018 | |
| EP | 3306337 A1 | 4/2018 | |
| WO | WO-2019174532 A1 * | 9/2019 | ............... H04B 1/40 |
| WO | WO-2020258995 A1 * | 12/2020 | |

OTHER PUBLICATIONS

W. Attaoui, K. Bouraqia and E. Sabir, "Initial Access & Beam Alignment for mmWave and Terahertz Communications," in IEEE Access, vol. 10, pp. 35363-35397, 2022, doi: 10.1109/ACCESS.2022.3161951. (Year: 2022).*

Keysight Technologies, "On Coarse&Fine TX Beam Peak Search Measurement Approaches", 3GPP TSG-RAN WG4 Meeting #88bis, R4-181358, Oct. 8-12, 2018, 5 pages.

International Search Report and Written Opinion dated Feb. 1, 2020, received for PCT Application PCT/CN2019/114743, Filed on Oct. 31, 2019, 10 pages including English Translation.

* cited by examiner

ELECTRONIC APPARATUS, WIRELESS COMMUNICATION METHOD AND COMPUTER-READABLE MEDIUM FOR MEASUREMENTS BASED ON ADJUSTED BEAM CONFIGURATIONS

CROSS-REFERENCE TO RELATED APPLICATIONS

The present application is based on PCT filing PCT/CN2019/114743, filed Oct. 31, 2019, which claims priority to CN 201811318599.8, filed Nov. 7, 2018, the entire contents of each are incorporated herein by reference.

FIELD

The present disclosure generally relates to the technical field of wireless communication, and in particular to an electronic device, a wireless communication method, and a computer-readable medium related to beam positioning.

BACKGROUND

The positioning in the mobile communication system may use beam positioning technology. The accuracy of beam positioning is limited by the distance between the user equipment to be positioned and the base station, the scale and topology of the base station antenna array, etc. For example, for cell edge user equipment that is far away from the base station, the positioning accuracy is low.

SUMMARY

A brief summary of embodiments of the present disclosure is given in the following, so as to provide basic understanding on some aspects of the present disclosure. It should be understood that this overview is not an exhaustive overview of the present disclosure. It is neither intended to determine a critical part or an important part of the present disclosure, nor to limit the scope of the present disclosure. The purpose is only to give some concepts in a simplified form, as a preface of the subsequent detailed descriptions.

According to one embodiment, an electronic device for wireless communication includes processing circuitry, which is configured to: determine a first location range of user equipment on the basis of first measurement information of the user equipment with respect to first beam scanning; when the first location range is lower than a predetermined accuracy requirement, determine an adjustment for a beam configuration on the basis of the first location range; and determine a second location range of the user equipment on the basis of second measurement information of the user equipment with respect to second beam scanning performed utilizing the adjusted beam configuration.

According to another embodiment, a wireless communication method includes: determine a first location range of user equipment on the basis of first measurement information of the user equipment with respect to first beam scanning; when the first location range is lower than a predetermined accuracy requirement, determine an adjustment of a beam configuration on the basis of the first location range; and determine a second location range of the user equipment on the basis of second measurement information of the user equipment with respect to second beam scanning performed utilizing the adjusted beam configuration.

According to another embodiment, an electronic device for wireless communication includes processing circuitry, which is configured to: perform control to measure first beam scanning to obtain first measurement information, where the first measurement information is used to determine a first location range of the electronic device; and perform control to measure second beam scanning using an adjusted beam configuration to obtain second measurement information, the second measurement information being used to determine a second location range of the electronic device. The adjustment for the beam configuration is determined based on the first location range.

According to another embodiment, a wireless communication method includes: measuring first beam scanning to obtain first measurement information, where the first measurement information is used to determine a first location range of an electronic device; and measuring second beam scanning using an adjusted beam configuration to obtain second measurement information, where the second measurement information is used for determining a second location range of the electronic device. The adjustment for the beam configuration is determined based on the first location range.

A computer readable medium is further provided according to an embodiment of the present disclosure. The computer readable medium includes executable instructions that, when executed by an information processing apparatus, cause the information processing apparatus to execute the methods according to the above embodiments.

The embodiments of the present disclosure are beneficial to improving an accuracy of beam positioning.

BRIEF DESCRIPTION OF THE DRAWINGS

The present disclosure can be understood better with reference to the detail description given in conjunction with the drawings in the following. The same or similar element is indicated by the same or similar reference numeral throughout all the drawings. The drawings together with the following detailed description are included in the specification and form a part of the specification, so as to illustrate preferred embodiments of the present disclosure by examples and explain principles and advantages of the present disclosure. In the drawings.

DETAILED DESCRIPTION OF THE EMBODIMENTS

Figure 1:
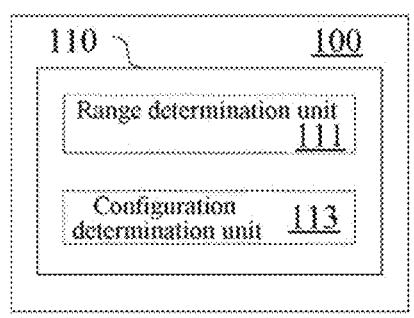
FIG. 1 is a block diagram showing a configuration example of an electronic device for wireless communication according to an embodiment of the present disclosure.

The embodiments of the present disclosure will be explained with reference to the drawings hereinafter. Elements and features described in one of the drawings or one of the embodiments of the present disclosure may be combined with elements and features described in one or more other drawings or embodiments. It is to be noted that, for the purpose of clarity, in the drawings and the descriptions, representations and descriptions of elements and processes that are irrelevant to the present disclosure and are known to those skilled in the art are not provided.

As shown in FIG. 1, an electronic device 100 for wireless communication according to an embodiment includes processing circuitry 110. The processing circuitry 110 may be implemented by a specific chip, a chipset, a central processing unit (CPU) or the like.

The processing circuitry 110 includes a range determination unit 111 and a configuration determination unit 113. It should be noted that, although the range determination unit 111 and the configuration determination unit 113 are shown in a form of functional blocks in the drawings, it should be understood that functions of units may be implemented by the processing circuitry as a whole, and may be not necessarily implemented by discrete actual components in the processing circuitry. In addition, although the processing circuitry is shown as one block in the drawings, the electronic device may include multiple processing circuitry. The functions of the units may be distributed to the multiple processing circuitry, so that the multiple processing circuitry cooperate to perform these functions.

The electronic device 100 according to the present embodiment may be set on a base station side, and may work as a location management function (LMF). LMF is used for mobile location management in New Radio (NR). It receives a positioning requirement, assigns a positioning task, and may also perform a location calculation.

A positioning request may be initiated on a user side or a network side. If the positioning request is initiated on the user side, for example, after an access management function (AMF) of a control plane receives the positioning request transmitted by the user, it forwards information related to the positioning request to a positioning service system, such as the LMF in NR. After the positioning service system completes a relevant positioning operation, it feeds back the obtained positioning information to the AMF, and the AMF transmits the information to the requesting entity. In some cases, AMF may also issue a positioning request by itself and require the positioning service system to complete the operation.

Positioning in a traditional mobile communication system such as Long Term Evolution (LTE) use Observed Time Difference of Arrival (OTDOA) technology based on propagation delay measurement. Because LTE uses multi-antenna technology to support a TRP configuration with up to 8 antennas, and has not yet applied Massive MIMO technology, it may not form a narrow beam with high directivity and high gain. In NR, using beam scanning for data transmission, 5G large-scale antenna technology may form a narrow beam with high gain, and may use the angle information of a beam to achieve high-accuracy positioning.

In terms of positioning methods, the LTE communication system uses OTDOA technology to calculate the location of user equipment (UE) by measuring the time difference of arrival. In terms of beam scanning, the minimum beam angle of beam scanning for signal transmission in 5G is limited by the number of base station antennas and a topological structure of the base station antennas, and with the increase of propagation distance of a beam, gain of the beam decreases exponentially, and coverage of the beam increases significantly, resulting in a larger error range of positioning location.

The positioning accuracy of the OTDOA technology used in LTE is very limited, especially the error in the vertical direction is relatively large. In different scenes, the best vertical positioning accuracy of OTDOA (Precise Synchronization) is more than 10 m, and the horizontal positioning accuracy is above meters. If beam scanning is used for positioning in NR, the positioning accuracy which can be obtained by many users, especially those who are far away from a main positioning base station, may not meet the positioning accuracy requirement of NR due to the propagation characteristics of a beam and the limitation of base station antenna array scale. The following is a simple calculation in a scene where beam scanning and positioning is performed by a single TRP: assuming that the narrowest beam angle is 4°, the positioning accuracy of NR is required to be 0.5 m, and if the positioning accuracy is to be achieved, it is calculated that the distance between UE to be positioned and TRP may not exceed 7 m. Although multi-TRP cooperative beam scanning and positioning may improve the positioning accuracy, the final accuracy is still limited by the narrowest beam angle (TRP antenna configuration), and the positioning accuracy is worse for UE far away from TRP.

With continued reference to FIG. 1, the range determination unit 111 of the electronic device 100 according to the present embodiment is configured to determine a first location range of a UE based on first measurement information of the UE with respect to first beam scanning.

The configuration determination unit 113 is configured to determine an adjustment for a beam configuration based on the first location range. According to one embodiment, the configuration determination unit 113 may determine the adjustment for the beam configuration only when the first location range is lower than a predetermined accuracy requirement.

The range determining unit 111 is further configured to determine a second location range of the UE based on second measurement information of the UE with respect to second beam scanning performed with the adjusted beam configuration.

According to an embodiment, the beam configuration may include beam direction or beam width or both the beam direction and the beam width.

According to an embodiment, the determination of the first location range and the second location range may be based on a transmission angle of the strongest beam received by the UE, or may be based on both the transmission angle of the strongest beam and receiving power of the strongest beam.

According to an embodiment, the first measurement information and the second measurement information may include information of the beam with the maximum receiving power determined by the UE by measuring receiving power of each beam in the beam scanning.

According to an embodiment, the adjustment for the beam configuration may include adjusting the beam direction so that adjacent beams divide the first location range. For example, the beam direction may be rotated by a certain angle, so that the boundary between adjacent beams divides the first location range.

More specifically, the adjustment for the beam configuration may include making two adjacent adjusted beams bisect the first location range, for example, making the boundary between two adjacent rotated beams bisect the first location range or pass through the center point of the first location range. Alternatively, the adjustment for the beam configuration may include minimizing the maximum area in all sub-regions after the first location range is divided by the adjusted (for example, rotated) beam.

In addition, the adjustment for the beam configuration may further include adjusting the beam direction and width so that the adjacent adjusted (for example, rotated) beams cover the first location range.

In addition, the second measurement information may include information about the beam with the maximum receiving power determined by the UE measuring at least two adjacent adjusted (for example, rotated) beams.

Figure 2:
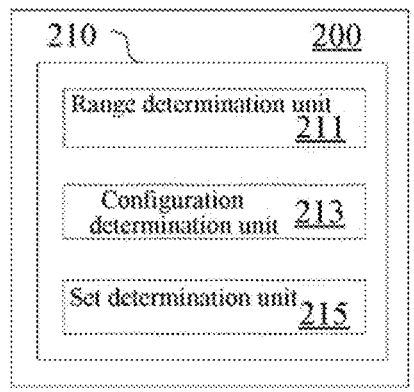
FIG. 2 is a block diagram showing a configuration example of an electronic device for wireless communication according to another embodiment.

FIG. 2 shows a configuration example of an electronic device for wireless communication according to another embodiment.

As shown in FIG. 2, the electronic device 200 includes processing circuitry 210. The processing circuitry 210 includes a range determination unit 211 and a configuration determination unit 213, which are similar to the range determination unit 111 and the configuration determination unit 113 described above with reference to FIG. 1, respectively. In addition, the processing circuitry 210 further includes a set determination unit 215.

The set determining unit 215 is configured to determine a first set of transmit/receive ports (TRP) of a wireless access point, for performing the first beam scanning based on the first beam configuration. The set determination unit 215 is further configured to determine a second set of TRPs of a wireless access point based on the first measurement information, for performing the second beam scanning based on a second beam configuration. The first and second sets of TRPs include one or more TRP circuits, respectively.

According to one embodiment, the set determination unit 215 may be configured to determine TRPs of a wireless access point adjacent to a main wireless access point of the cell where the UE is located as the first set of TRPs. Or, the set determination unit 215 may be configured to determine the first set of TRPs according to strength of an uplink signal transmitted by UE which is received by TRPs of a wireless access point, for example, TRPs with high signal strength are determined as the first set of TRPs.

In addition, the set determination unit 215 may be configured to determine TRPs of a wireless access point adjacent to the first location range of the UE as the second set of TRPs. Or, the set determination unit 215 may be configured to determine the second set of TRPs according to strength of an uplink signal transmitted by the UE which is received by TRPs of a wireless access point, for example, TRPs with high signal strength are determined as the second set of TRPs.

The first set of TRPs may be a selected initial set of TRPs, and may receive measurement information of the UE with respect to the beam corresponding to the maximum receiving power in the initial set of TRPs, determine the first location range according to the initial set of TRPs, and improve an accuracy of the positioning location of the user equipment by limiting the location range.

Figure 3:
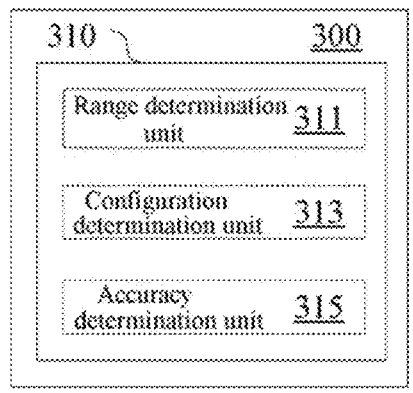
FIG. 3 is a block diagram showing a configuration example of an electronic device for wireless communication according to yet another embodiment.

FIG. 3 shows a configuration example of an electronic device for wireless communication according to another embodiment.

As shown in FIG. 3, the electronic device 300 includes a processing circuitry 310. The processing circuitry 310 includes a range determination unit 311 and a configuration determination unit 313, which are similar to the range determination unit 111 and the configuration determination unit 113 described above with reference to FIG. 1, respectively. In addition, the processing circuitry 310 further includes an accuracy determination unit 315.

The accuracy determination unit 315 is configured to determine whether the second location range meets a positioning accuracy requirement. In case that the second location range does not meet the positioning accuracy requirement, an adjustment for the beam configuration may be further determined by the configuration determining unit 313.

According to one embodiment, the accuracy determination unit 315 may determine whether the second location range meets the positioning accuracy requirement based on one or more of the following conditions: the maximum deviation of the second location range is smaller than a location deviation under the positioning accuracy requirement; an area of the second location range is smaller than a location uncertainty area under the positioning accuracy requirement; and a weighted average location deviation in respective directions of the second location range is smaller than a weighted average location deviation under the positioning accuracy requirement. The accuracy determination unit 315 may determine whether the first location range meets the positioning accuracy requirement in a similar manner.

Next, an exemplary process of beam positioning according to an embodiment of the present disclosure will be explained with a specific example. It should be noted that many aspects of the above embodiments of the present disclosure are included in the following examples.

Figure 7:
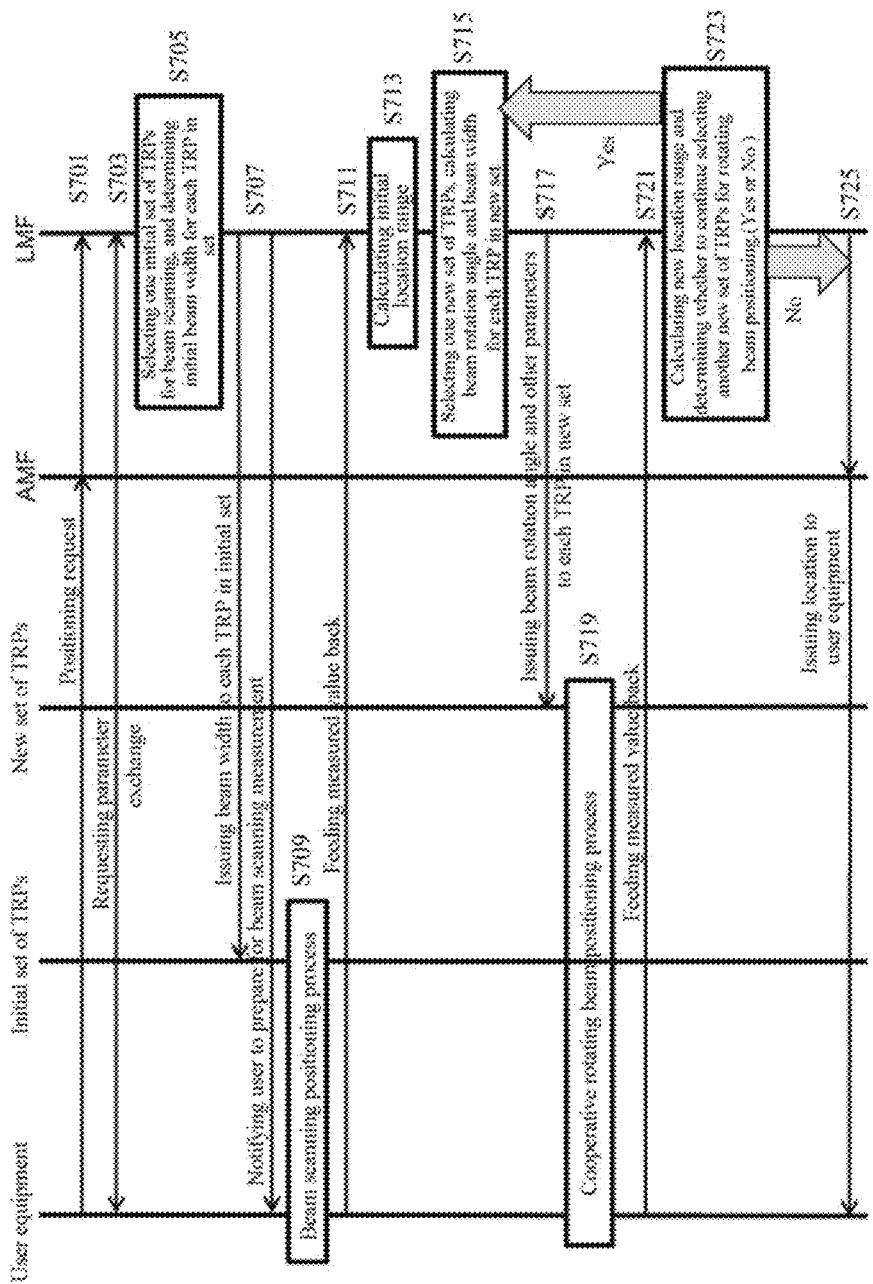
FIG. 7 is a signaling flowchart showing an example of a process according to an embodiment of the present disclosure.

FIG. 7 shows an exemplary process of base station cooperative positioning based on rotating beam which is an exemplary embodiment of the present disclosure.

In this cooperative positioning process, firstly, an initial set of TRPs is selected for beam scanning, and an initial location range of UE is determined. Then, optionally, according to the initial location range and a positioning accuracy requirement, a new set of TRPs is selected and a beam rotation angle and direction of each TRP are calculated cooperatively. Each TRP transmits two beams sequentially at the determined beam rotation angle and direction. Through the UE feeding beam measurement value back, an accurate location of the UE is determined within the initial location range. Finally, it is determined whether the positioning is completed, according to UE positioning accuracy requirement.

More specifically, as shown in FIG. 7, the process may start in response to a positioning request by the UE (S701). Thereafter, based on a system configuration, parameters may be exchanged among respective units (S703).

In S705, a main TRP/LMF selects the initial set of TRPs for beam scanning, and calculates a beam width for each TRP in the initial set.

Then, the main TRP/LMF may issue the beam width to each TRP in the initial set and notify each TRP to perform beam scanning and UE to perform measurement (S707).

Next, in S709, the UE performs a beam positioning process, and feeds measurement information back to the main TRP/LMF (or each TRP in the initial set) in S711.

In S713, the main TRP/LMF (or the TRPs in the initial set, cooperatively) calculates the initial location range of the UE.

In S715, the main TRP/LMF may select a new set of TRPs for rotating beam positioning, and the main TRP/LMF (or respective TRPs in the new set, cooperatively) calculates a beam rotation angle, direction and beam width for each TRP.

If the calculation is performed by the main TRP/LMF, the main TRP/LMF may deliver the beam rotation angle and other parameters to each TRP in the new set (S717).

In S719, each TRP in the new set of TRPs cooperates to perform rotating beam positioning within the initial location range.

In S721, the UE feeds the measurement information back to the main TRP/LMF (or each TRP in the new set).

In S723, the main TRP/LMF (or respective TRPs in the new set, cooperatively) calculates a new location range of the UE, and the main TRP or LMF may determine whether the positioning is completed according to the UE positioning accuracy requirement.

If the positioning accuracy requirement is met, that is, no further beam positioning is required ("No" in S723), then in S725, the determined location is issued to the UE.

If the positioning accuracy requirement is not met, that is, further beam positioning is required ("Yes" in S723), then the process returns to step S715 to repeat the positioning process.

Next, the beam positioning process according to the exemplary embodiment of the present disclosure may be described in more detail.

When the UE positioning request reaches the LMF (S701), the system first enters a initialization phase.

In S703, the UE and the LMF may exchange information such as a type of a main TRP where the UE is located, a shape of an antenna array, and a coverage area. Multiple TRPs near the main TRP may also report the above information to the main TRP or LMF. For example, the type of TRP may be a macro base station or a small base station, and the shape of the antenna array may be a planar array, a uniform linear array (ULA) or other topological shapes.

After information about multiple TRPs near the UE is collected by the main TRP or LMF, in S705, according to the positioning requirement of the UE, TRPs participating in cooperative positioning are determined to form an initial set of TRPs, and the beam width for each TRP for beam scanning is determined.

For the selection for the initial set of TRPs participating in the beam scanning, an actual measurement method based on a reference signal may also be adopted. Specifically, the UE may transmit an uplink reference signal, and each TRP near the main TRP measures parameters such as power of a received signal through the reference signal. After receiving the measured power value fed back by each TRP, the main TRP or LMF selects several TRPs with the strongest received signal power to form an initial set of TRPs. The specific number of TRPs for the beam scanning and the beam scanning width for each TRP may be determined according to factors such as positioning accuracy and resource overhead.

After the initial set of TRPs is selected, in S707, the main TRP or LMF notifies the TRPs in the initial set of TRPs to perform beam scanning at the same time and issue the beam scanning width for each TRP, and notify the UE to perform beam measurement.

After each TRP receives the notification, in S709, beam scanning is performed on the selected time slot. Specifically, the UE receives beams from the beam scanning by each TRP in the initial set of TRPs, measures the receiving power of each beam, and reports beam number corresponding to the maximum receiving power for each TRP and the maximum receiving power to the main TRP/LMF or each TRP in the initial set (S711).

Figure 8:
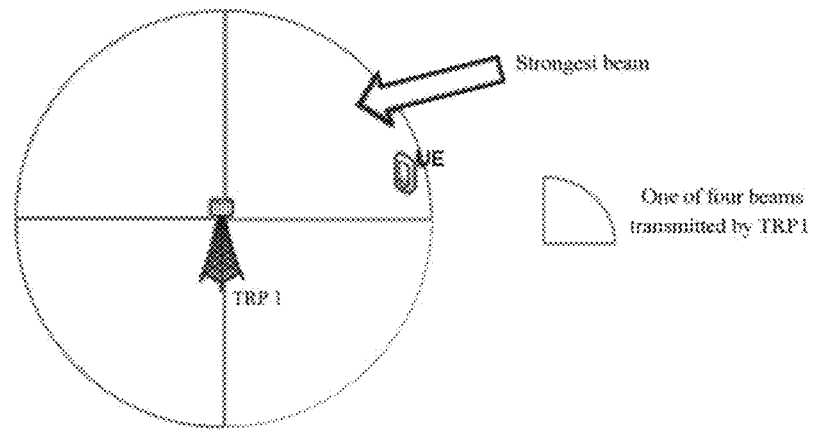
FIG. 8 is a schematic diagram for explaining the beam scanning process.

FIG. 8 shows an example of the beam scanning process of TRP. In this example, TRP1 transmits four beams in sequence, and the UE measures the receiving power of these four beams, respectively, and finds the beam with the maximum receiving power, for example, reports corresponding beam number and power to the main TRP or LMF.

Referring back to FIG. 7, in S713, the main TRP or LMF or each TRP in the initial set may calculate a location range of the UE according to the strongest beam and corresponding receiving power of each TRP reported by the UE.

Figure 9:
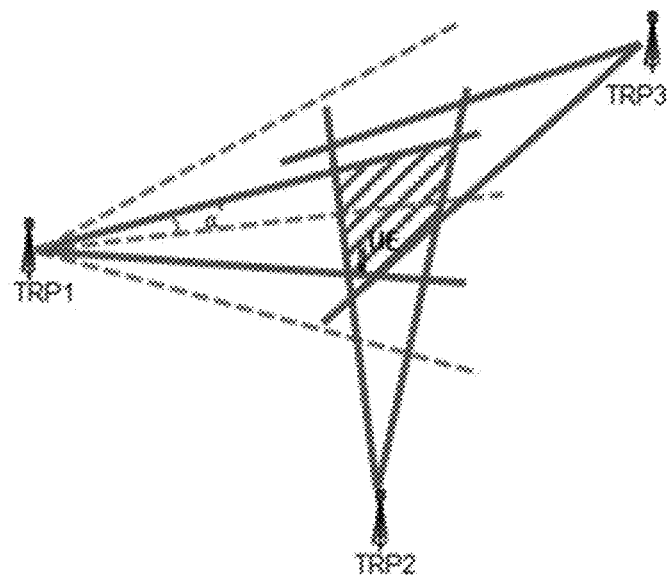
FIG. 9 is a schematic diagram for explaining rotating beam positioning.

In the example shown in FIG. 9, the solid line indicates the range of the strongest beams of TRP1, TRP2, and TRP3 reported by the UE, and an overlapping area of which, that is, the shaded area, is determined as the location range of the UE. If the location range meets the positioning accuracy requirement of UE, the location may be directly reported to the UE. If the location range does not meet the positioning accuracy requirement of UE, subsequent steps need to be performed to further determine the location range.

As described above, the determination of the location range may be based on a transmission angle of the strongest beam received by the UE, or may be based on both the transmission angle of the strongest beam and receiving power of the strongest beam.

Figure 10:
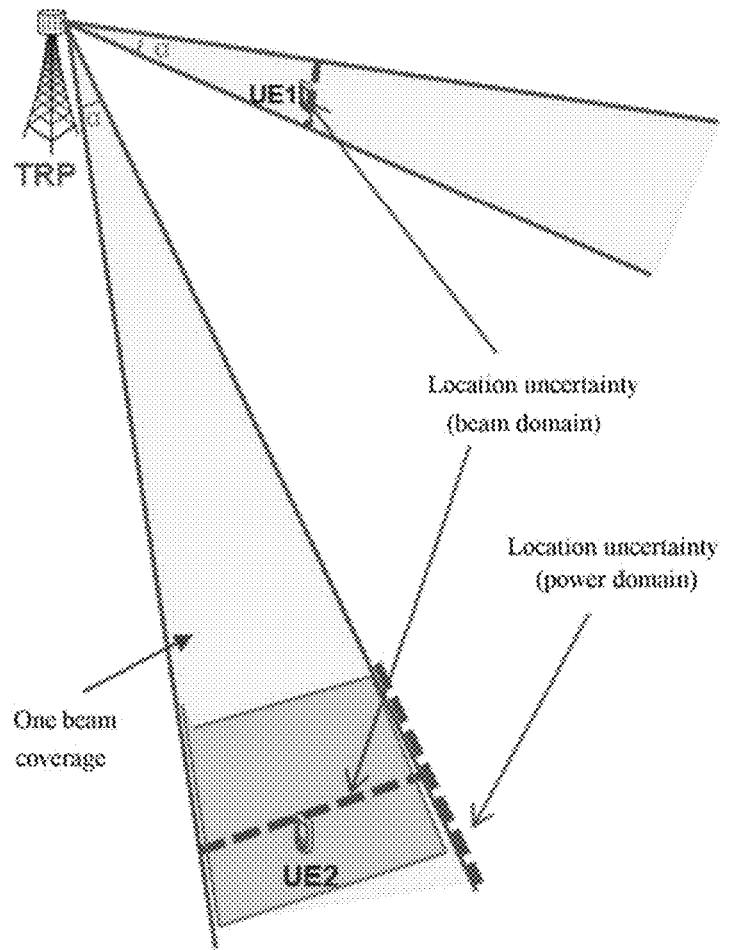
FIG. 10 is a schematic diagram for explaining beam scanning and positioning of a single transmit/receive port (TRP)
Figure 12:
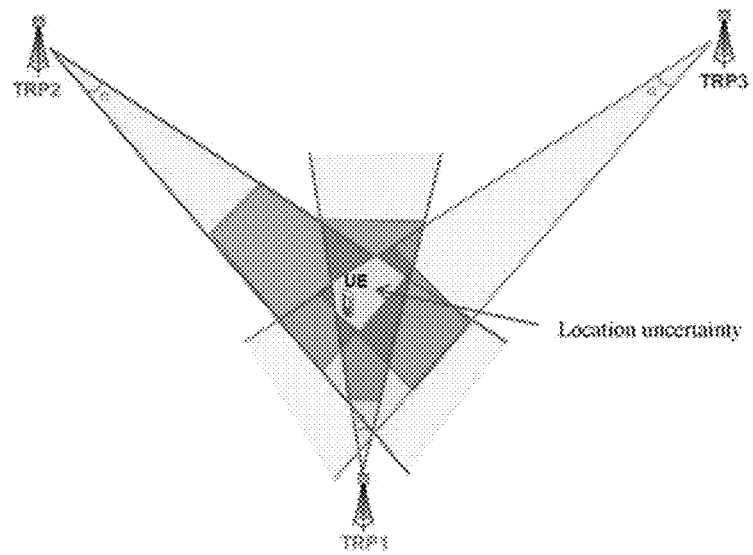
FIG. 12 is a schematic diagram for explaining the beam scanning and positioning of three TRPs.
Figure 14:
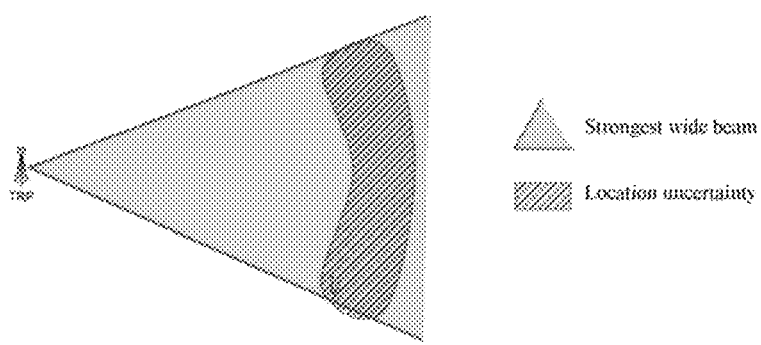
FIG. 14 is a schematic diagram for explaining beam scanning and positioning of a single TRP.

FIGS. 10, 12, and 14 show examples of determining the location range based on both the transmission angle of the strongest beam and the receiving power of the strongest beam.

In the example shown in FIG. 10, a single TRP calculates the location range of the UE through feedback of the beam angle and receiving power, as shown in the shaded area where UE2 is located in the Figure.

The location range of the UE may also be calculated based on feedback of beam angles and receiving power for multiple TRPs. FIG. 12 shows an example of calculating the location range of the UE based on the feedback of the beam angles and receiving power of three TRPs.

In addition, the location range of the UE may further be calculated through feedback of a wide beam angle and receiving power. FIG. 14 shows the location range after wide-beam scanning and positioning is performed by a single TRP, as shown by the slanted area in the Figure.

Figure 11:
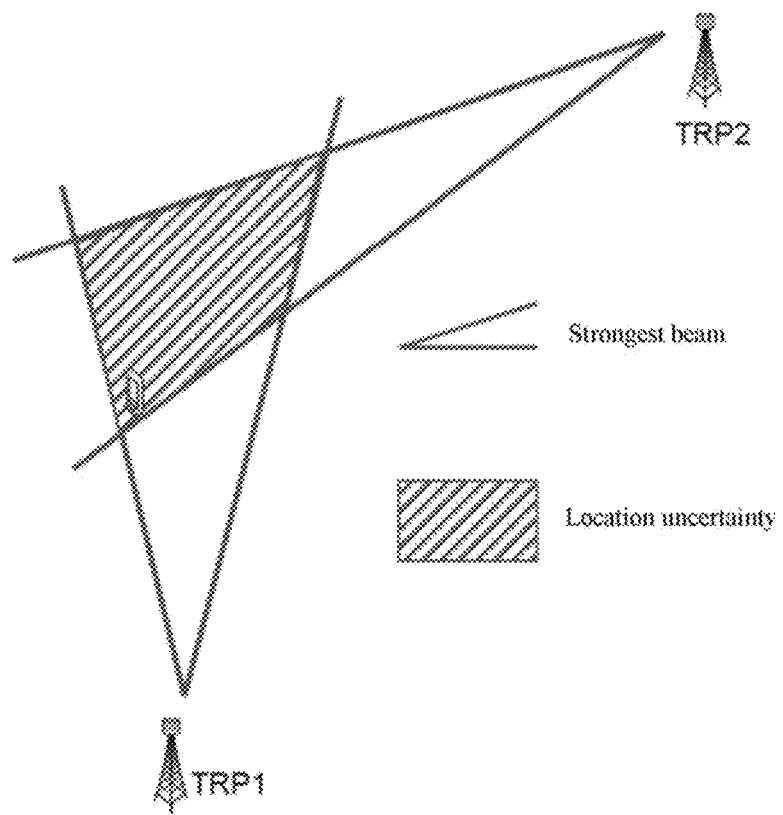
FIG. 11 is a schematic diagram for explaining the beam scanning and positioning of two TRPs.
Figure 13:
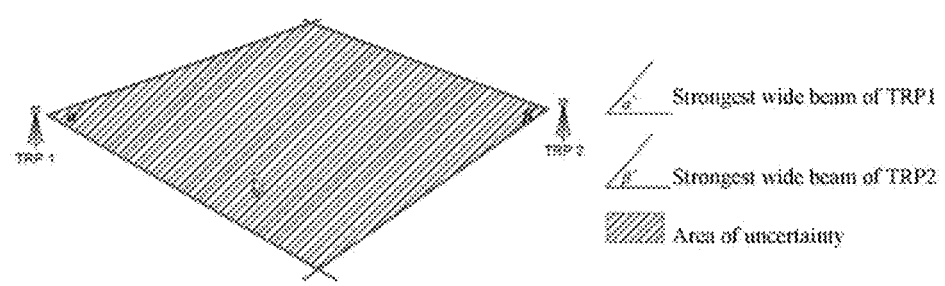
FIG. 13 is a schematic diagram for explaining the beam scanning and positioning of two TRPs.

FIG. 11 and FIG. 13 show examples of determining the location range based on the transmission angle of the strongest beam.

In the example shown in FIG. 11, the location range of the UE is calculated based on feedback of beam angles of two TRPs, as shown by the slanted area in the Figure.

In addition, multiple TRPs may perform beam scanning with different widths. FIG. 13 shows an example of the location range after wide beam scanning and positioning is performed by two TRPs. As shown in FIG. 13, beam scanning widths of TRP1 and TRP2 are $\alpha°$ and $\beta°$, respectively, and the location range after beam scanning is the slanted area.

With continued reference to FIG. 7, based on the location range of the UE calculated in S713 and the positioning accuracy requirement, in S715, the main TRP/LMF selects the number and location of TRPs for rotating beam cooperative positioning and adds these TRPs to the new set of TRPs, and the main TRP/LMF, or respective TRPs in the new set, cooperatively, calculates the beam rotation angle, direction and beam width for each TRP.

As an example, the determination of the beam rotation angle, direction and beam width may be based on one or more of the following criterions:
1) The boundary between two adjacent rotating beams of each TRP in the new set bisects the initial location range as much as possible, or passes through a center point of the initial location range;
2) All TRPs in the new set cooperate to calculate the beam rotation angle and direction, so that the maximum area in all sub-regions after the initial location range is divided by all rotating beams is minimized; and
3) The selection for the rotation direction and width for the two adjacent rotating beams of each TRP in the new set need to cover the initial location range.

Figure 16:
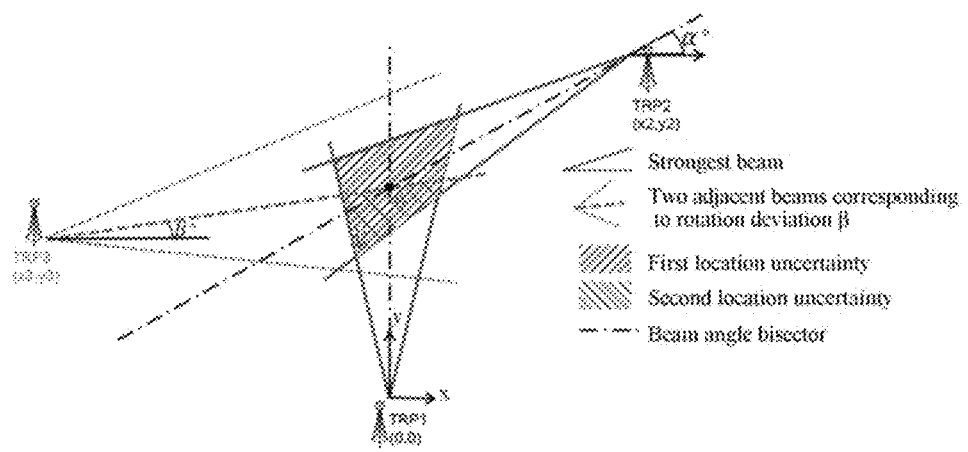
FIG. 16 is a schematic diagram for explaining the beam rotation angle.

FIG. 16 shows an example that satisfies the first criterion, in which TRP3 is selected by the main TRP or LMF for rotating beam positioning. According to the location range calculated after the beam scanning process, point A in the center of the location range is given, so that the boundary between two adjacent beams transmitted by TRP3 in the rotating beam positioning process passes through the point A, thereby the beam rotation angle $\beta°$ is obtained. The main TRP or LMF notifies TRP3 of the calculated beam rotation angle of TRP3 and requests TRP3 to perform rotating beam positioning, and notifies the UE, at the same time, to prepare for rotating beam measurement (S717).

An example of beam rotation angle calculation is described below with reference to FIG. 16.

It is assumed that the coordinates of TRP1, TRP2 and TRP3 which have been used for beam scanning and positioning are (0,0), (x2,y2) and (x3,y3). A direction of the strongest beam at TRP1 beam scanning phase is y axis, an angle of the strongest beam of TRP2 relative to x axis is $\alpha°$, and point A is the intersection between the directions of the strongest beams of TRP1 and TRP2. The main TRP or LMF selects TRP3 for rotating beam positioning. The principle for determining the beam rotation angle is that a direction of a rotating beam of TRP3 passes through point A. Therefore, the beam rotation angle $\beta°$ may be calculated according to the following formula:

$$\beta° = \tan^{-1}\frac{y2 - x2\tan\alpha° - y3}{-x3}$$

Continuing to refer to FIG. 7, according to the beam rotation angle calculated in S715, in S719, each TRP sequentially transmits two adjacent beams corresponding to the beam rotation angle for the location range, so as to perform rotating beam positioning.

Figure 15:
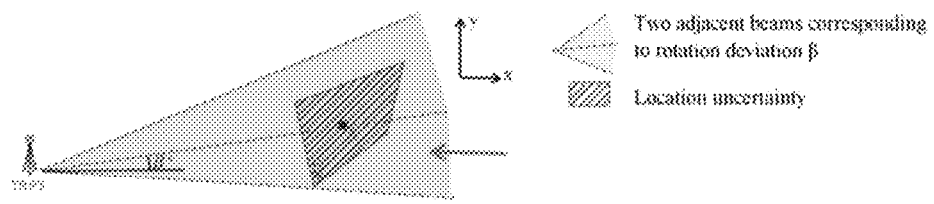
FIG. 15 is a schematic diagram for explaining rotating beam positioning.

Referring again to FIG. 15, TRP3 performs rotating beam positioning according to the calculated beam rotation angle and beam width, and sequentially transmits two adjacent beams corresponding to the beam rotation angle.

Figure 17:
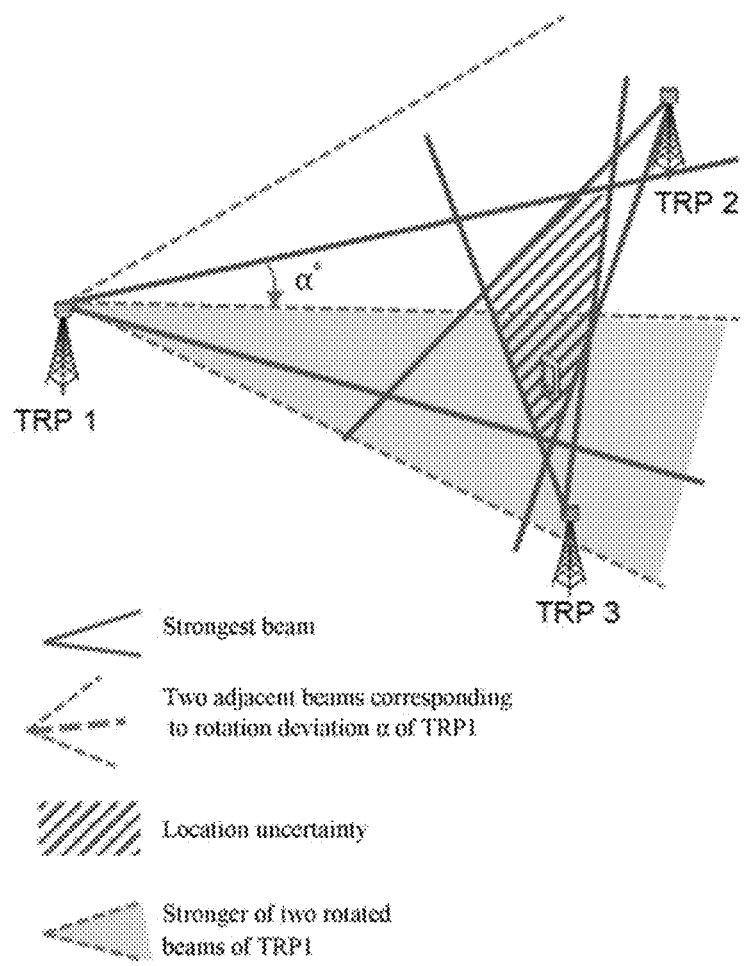
FIG. 17 is a schematic diagram for explaining rotating beam positioning.
Figure 18:
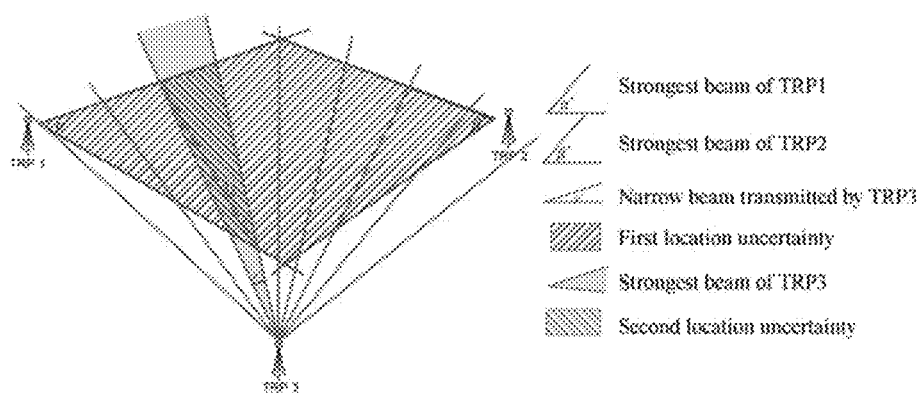
FIG. 18 is a schematic diagram for explaining narrow beam rotating and positioning.
Figure 19:
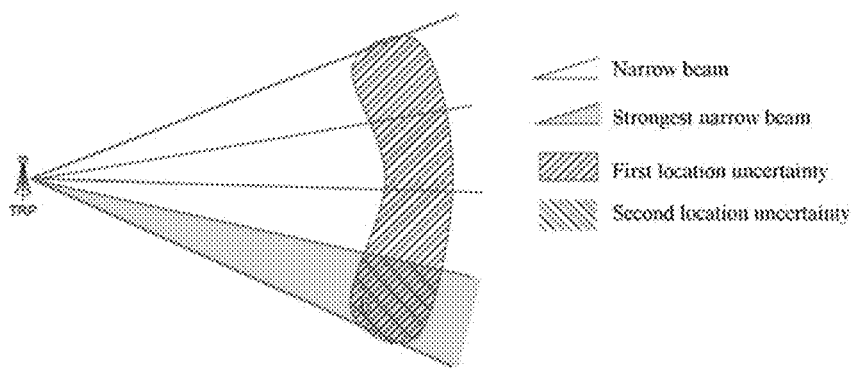
FIG. 19 is a schematic diagram for explaining narrow beam rotating and positioning performed by a single TRP.

FIGS. 17 to 19 show exemplary ways of rotating beam positioning.

In the example shown in FIG. 17, after TRP1 is selected for beam scanning and positioning (S709), TRP1 is selected for rotating beam positioning (S719). When performing the rotating beam positioning, TRP1 sequentially transmits two adjacent beams determined by the beam rotation angle.

In the example shown in FIG. 18, after TRP1 and TRP2 are selected for wide beam scanning and positioning (S709), and TRP3 is selected for narrow rotating beam positioning (S719). When performing the narrow rotating beam positioning, TRP3 sequentially transmits multiple adjacent beams determined by the beam rotation angle to the initial location range.

In the example shown in FIG. 19, a single TRP is selected for wide beam scanning and positioning through a wide beam angle and receiving power (S709), and then is selected for narrow rotating beam positioning (S719). When performing the narrow rotating beam positioning, the TRP sequentially transmits multiple adjacent beams determined by the beam rotation angle to the initial location range.

Continuing to refer to FIG. 7, the UE measures receiving power of adjacent beams corresponding to each TRP, selects a beam with a larger receiving power corresponding to each TRP, and reports the number and receiving power of the strongest beam to the main TRP/LMF or each TRP in the new set (S721). The main TRP/LMF or each TRP in the new set determines the strongest virtual beam with the above strongest beam and the strongest beam at the beam scanning phase jointly. The main TRP/LMF or each TRP in the new set cooperates to calculate a new location range according to the strongest virtual beam and receiving power of each TRP (S723).

Figure 20:
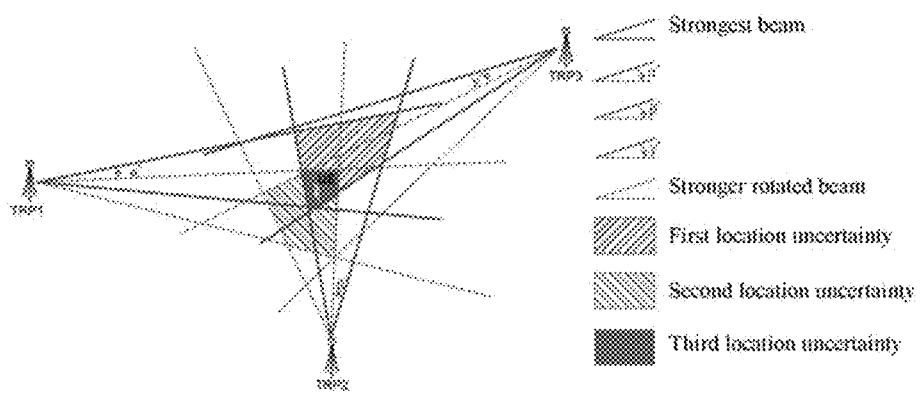
FIG. 20 is a schematic diagram for explaining beam rotating and positioning performed by multiple TRPs.

As shown in FIG. 20, the "first location uncertainty" area and the "second location uncertainty" area are the initial location range at the beam scanning phase and the location range at the rotating beam positioning phase, respectively, and the overlapping area between the "first location uncertainty" area and the "second location uncertainty" area, that is, the "third location uncertainty" area, is determined as the location range of the UE.

In S723, after calculating the new location range of the UE, the main TRP or LMF may determine whether the positioning is completed according to the positioning accuracy requirement of the UE. If the new location range meets the positioning accuracy requirement of the UE, the main TRP or LMF may directly report the location to the UE (S725); if the new location range does not meet the positioning accuracy requirement of the UE, then the process returns to S715 to continue the rotating beam positioning.

The determination on whether the positioning is completed by the main TRP or LMF may be based on the calculated new location range and positioning accuracy requirement, and may be based on one or more of the following requirements:

1) The maximum deviation of the location range is less than a location deviation under the positioning accuracy requirement;
2) An area of the location range is smaller than a location uncertainty area under the positioning accuracy requirement; and
3) A weighted average location deviation in respective directions of the location range is less than a weighted average location deviation under the positioning accuracy requirement.

Regarding requirement 1), a detailed description is given with reference to FIG. 18 again. FIG. 18 shows that after TRP1 and TRP2 are selected for wide beam scanning positioning, TRP3 is selected for narrow rotation beam positioning. When performing the narrow rotating beam positioning, TRP3 sequentially transmits multiple adjacent beams determined by the beam rotation angle to the initial location range. After TRP3 completes the rotating beam positioning, TRPs cooperate to calculate a new location range, as shown in the "second location uncertainty" area in the Figure.

Based on this location range, the maximum deviation may be calculated as shown by the dotted diagonal line in the "second location uncertainty" area. Assuming that the maximum deviation of the new location range (the dotted diagonal line) is 3 m, and the location deviation under the positioning accuracy requirement is 5 m, then the location range meets the positioning accuracy requirement, the location is directly reported to the UE, and the positioning process ends.

Figure 21:
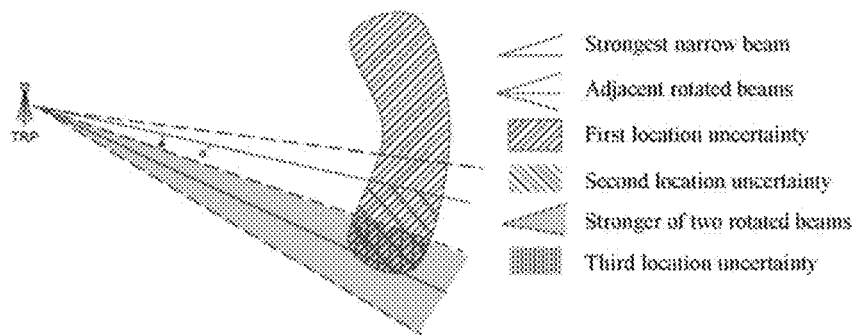
FIG. 21 is a schematic diagram for explaining secondary beam rotating and positioning performed by a single TRP.

This step is further explained below with reference to FIG. 21.

Assuming that a same TRP is selected for wide beam scanning positioning and narrow rotating beam positioning successively, the initial location range after the wide beam positioning is shown as the "first location uncertainty" area in the Figure, and the new location range after the narrow rotating beam positioning is shown as the "second location uncertainty" area in the Figure. Assuming that the location range of the "second location uncertainty" area still does not meet the UE positioning accuracy requirement, the main TRP or LMF needs to continue to select a new set of TRPs for rotating beam positioning. If the same TRP is selected for rotating beam positioning, and finally the "third location uncertainty" area in the Figure is calculated as a new location range, which meets the positioning accuracy requirement of UE, the location range is issued to the UE to be positioned.

It should be pointed out that the present disclosure is not limited to the specific details in the above examples.

Depending on the specific configuration, the embodiments of the present disclosure have one or more of the following advantages:

the positioning accuracy is not limited by the number of base station antennas (beam angle resolution);

a long-distance positioning accuracy is improved significantly;

cooperative positioning by multiple TRPs may be realized, which is suitable for scenes where different numbers of TRPs perform positioning, cooperatively;

the positioning scheme is more flexible, which allows a better balance among the positioning accuracy, time delay, and resource consumption to be achieved;

the measurement for the receiving power by the user equipment is introduced in combination with the beam angle range to assist positioning jointly, to improve an accuracy.

In the above description of the device according to the embodiments of the present disclosure, it is apparent that some methods and processes are also disclosed. Next, the wireless communication methods according to the embodiments of the present disclosure are described without repeating details described above.

Figure 4:
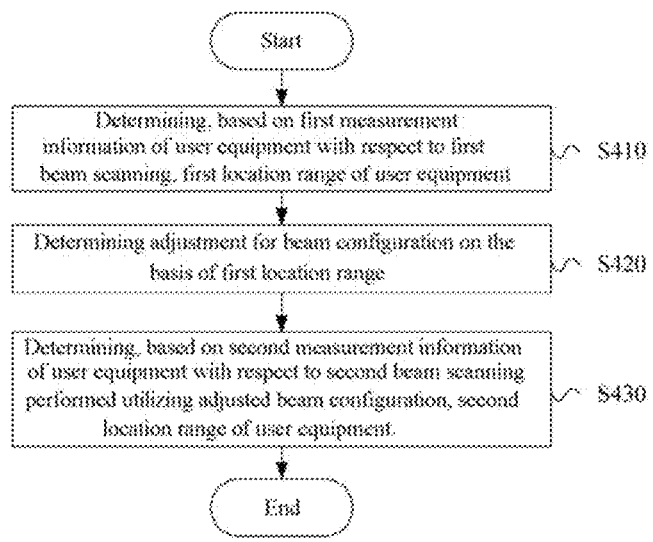
FIG. 4 is a flowchart showing a process example of a wireless communication method according to an embodiment of the present disclosure.

As shown in FIG. 4, a wireless communication method according to an embodiment includes the following steps S410 to S430.

In S410, a first location range of user equipment is determined based on a first measurement information of the user equipment with respect to first beam scanning.

In S420, based on the first location range, an adjustment for a beam configuration is determined. This step may be performed only when the first location range is lower than a predetermined accuracy requirement.

In S430, based on second measurement information of the user equipment with respect to second beam scanning performed utilizing the adjusted beam configuration, a second location range of the user equipment is determined.

The foregoing describes the embodiments corresponding to the base station side or the LMF, and the present application further includes embodiments implemented on the UE side.

Figure 5:
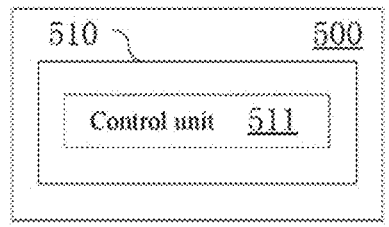
FIG. 5 is a block diagram showing a configuration example of an electronic device for wireless communication according to an embodiment of the present disclosure.

As shown in FIG. 5, the electronic device 500 for wireless communication according to an embodiment includes a processing circuitry 510, and the processing circuitry 510 includes a control unit 511.

The control unit 511 is configured to perform control to measure first beam scanning to obtain first measurement information. The first measurement information is used to determine a first location range of the electronic device.

The control unit 511 is further configured to perform control to measure second beam scanning using an adjusted beam configuration to obtain second measurement information. The second measurement information is used to determine a second location range of the electronic device. The adjustment for the beam configuration is determined based on the first location range.

The electronic device 500 may work as user equipment.

Figure 6:
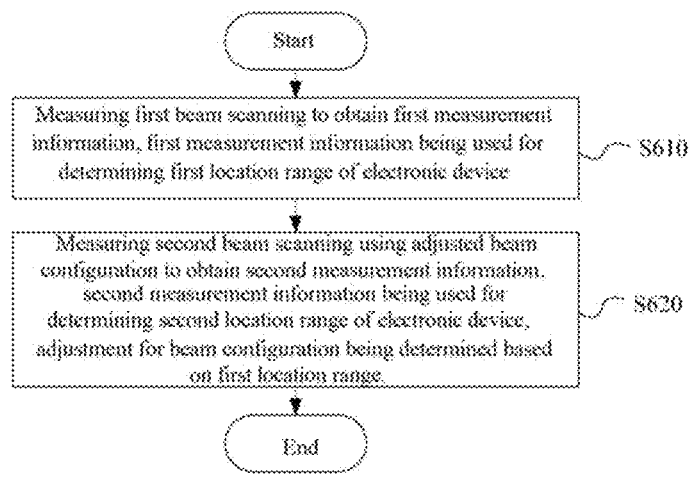
FIG. 6 is a flowchart showing a process example of a wireless communication method according to an embodiment of the present disclosure.

FIG. 6 shows a wireless communication method according to an embodiment, which is implemented on the user equipment side, for example.

The method includes S610, at which first beam scanning is measured to obtain first measurement information, where the first measurement information is used to determine a first location range of an electronic device.

The method further includes S620, at which second beam scanning using an adjusted beam configuration is measured to obtain second measurement information, where the second measurement information is used to determine a second location range of the electronic device. The adjustment for the beam configuration is determined based on the first location range.

In addition, an embodiment of the present disclosure further includes a computer-readable medium, which includes executable instructions that, when executed by an information processing apparatus, cause the information processing apparatus to implement the method according to the above embodiments.

As an example, various steps of the methods above and various modules and/or units of the devices above may be implemented as software, firmware, hardware or a combination thereof. In a case of being implemented by software or firmware, programs constituting the software for implementing the methods above are installed to a computer with a dedicated hardware structure (for example, a general-purpose computer 2200 shown in FIG. 22) from a storage medium or network. The computer can perform various functions when installed with various programs.

Figure 22:
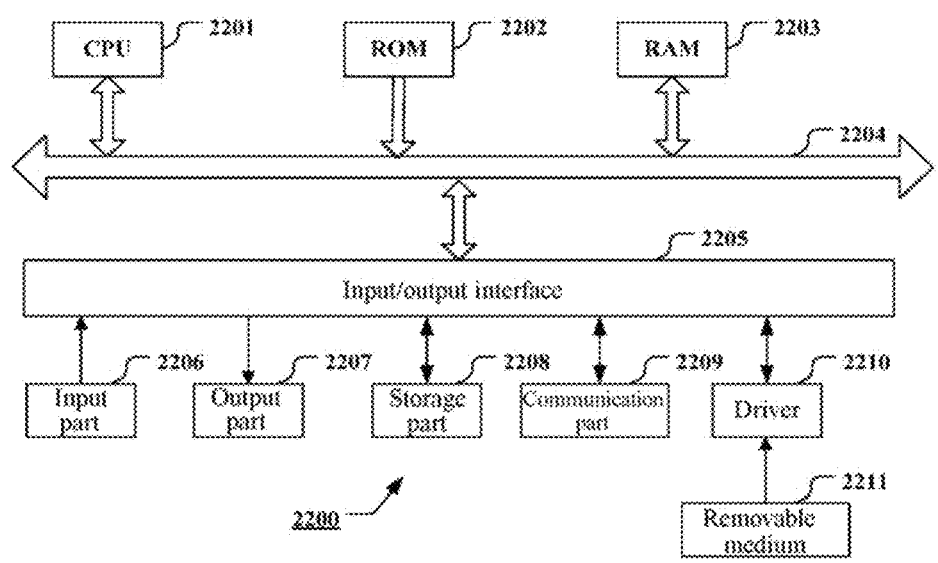
FIG. 22 is a block diagram showing an exemplary structure of a computer for implementing the method and device according to the present disclosure.

In FIG. 22, an arithmetic processing unit (i.e., CPU) 2201 performs various processing according to programs stored in a read only memory (ROM) 2202 or programs loaded from a storage part 2208 to a random access memory (RAM) 2203. The data required when the CPU 2201 executes various processing or the like may be stored in the RAM 2203 as needed. The CPU 2201, the ROM 2202, and the RAM 2203 are linked to each other via a bus 2204. The input/output interface 2205 is also linked to the bus 2204.

The following components are linked to the input/output interface 2205: an input part 2206 (including a keyboard, a mouse or the like), an output part 2207 (including a display such as a cathode ray tube (CRT) and a liquid crystal display (LCD), a loudspeaker or the like), a storage part 2208 (including a hard disk and so on), and a communication part 2209 (including a network interface card, such as a LAN card and a modem). The communication part 2209 performs communication processing via a network such as the Internet. The driver 2210 may also be linked to the input/output interface 2205 as needed. A removable medium 2211 such as a magnetic disk, an optical disk, a magnetic-optical disk and a semiconductor memory may be installed on the driver 2210 as needed, such that computer programs read from the removable medium 2311 are installed on the storage part 2208 as needed.

In a case of performing the series of processing described above by software, programs constituting the software are installed from network such as the Internet or a storage medium such as the removable medium 2211.

Those skilled in the art should understand that the storage medium is not limited to the removable medium 2211 shown in FIG. 22 that has a program stored therein and is distributed separately from the device so as to provide the program to a user. Examples of the removable medium 2211 include a magnetic disk (including a floppy disk (registered trademark)), an optical disk (including a compact disk read only memory (CD-ROM) and a digital versatile disk (DVD)), a magnetic-optical disk (including a mini disk (MD) (registered trademark)), and a semiconductor memory. Alternatively, the storage medium may be a hard disk included in the ROM 2202 and the storage part 2208 or the like. The storage medium has a program stored therein and is distributed to the user together with a device in which the storage medium is included.

A program product having machine readable instruction codes stored therein is further provided according to an embodiment of the present disclosure. The instruction codes, when read and executed by a machine, perform the above methods according to the embodiments of the present disclosure.

Accordingly, a storage medium for carrying the above program product having the machine readable instruction codes stored therein is also included in the disclosure. The storage medium includes but is not limited to a floppy disc, an optical disc, a magnetic optical disc, a memory card, a memory stick or the like.

The following electronic device is involved in the embodiments of the present disclosure. In a case that the electronic device is used for base station side, the electronic device may be implemented as any type of gNB or evolved node B (eNB), such as a macro eNB and a small eNB. The small eNB may be an eNB that covers a cell smaller than a macro cell, such as a pico eNB, a micro eNB and a home (femto) eNB. Alternatively, the electronic device may be implemented as any other types of base stations, such as a NodeB and a base transceiver station (BTS). The electronic device may include: a body configured to control wireless communication (which is also referred to as a base station device); and one or more remote radio heads (RRH) disposed at a position different from the body. In addition, various types of terminals, which will be described below, may each operate as the base station by temporarily or semi-persistently executing a base station function.

In a case that the electronic device is used for a user equipment side, the electronic device may be implemented as a mobile terminal (such as a smart phone, a tablet personal computer (PC), a notebook PC, a portable game terminal, a portable/dongle mobile router and a digital camera) or an in-vehicle terminal (such as a car navigation device). Furthermore, the electronic device may be a wireless communication module (such as an integrated circuit module including a single die or multiple dies) mounted on each of the terminals described above.

[Application Example Regarding Terminal Equipment]

Figure 23:
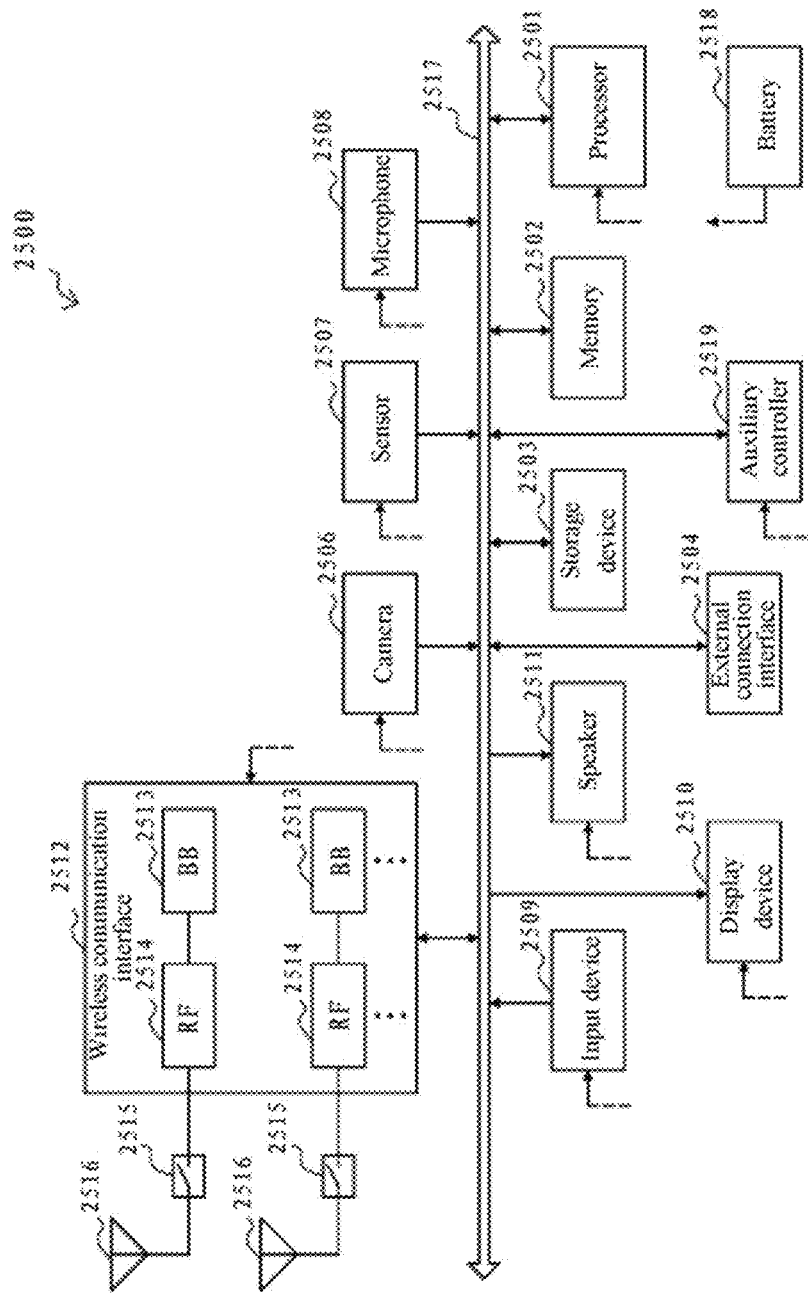
FIG. 23 is a block diagram showing an example of a schematic configuration of a smartphone to which the technology of the present disclosure may be applied.

FIG. 23 is a block diagram illustrating an example of exemplary configuration of a smart phone 2500 to which the technology of the present disclosure may be applied. The smart phone 2500 includes a processor 2501, a memory 2502, a storage device 2503, an external connection interface 2504, a camera 2506, a sensor 2507, a microphone 2508, an input device 2509, a display device 2510, a speaker 2511, a wireless communication interface 2512, one or more antenna switches 2515, one or more antennas 2516, a bus 2517, a battery 2518 and an auxiliary controller 2519.

The processor 2501 may be, for example, a CPU or a system on chip (SoC), and controls functions of an application layer and another layer of the smart phone 2500. The memory 2502 includes an RAM and an ROM, and stores programs executed by the processor 2501 and data. The storage device 2503 may include a storage medium such as a semiconductor memory and a hard disk. The external connection interface 2504 is an interface for connecting an external device (such as a memory card and a universal serial bus (USB) device) to the smart phone 2500.

The camera 2506 includes an image sensor (such as a charge coupled device (CCD) and a complementary metal oxide semiconductor (CMOS)), and generates a captured image. The sensor 2507 may include a group of sensors such as a measurement sensor, a gyro sensor, a geomagnetic sensor, and an acceleration sensor. The microphone 2508 converts sound that is inputted to the smart phone 2500 into an audio signal. The input device 2509 includes, for example, a touch sensor configured to detect touch onto a screen of the display device 2510, a keypad, a keyboard, a button, or a switch, and receive an operation or information inputted from a user. The display device 2510 includes a screen such as a liquid crystal display (LCD) and an organic light-emitting diode (OLED) display, and displays an output image of the smart phone 2500. The speaker 2511 converts an audio signal that is outputted from the smart phone 2500 to sound.

The wireless communication interface 2512 supports any cellular communication scheme (such as LTE and LTE-advanced), and performs wireless communication. The wireless communication interface 2512 may include, for example, a baseband (BB) processor 2513 and radio frequency (RF) circuit 2514. The BB processor 2513 may perform for example coding/decoding, modulation/demodulation and multiplexing/de-multiplexing, and perform various types of signal processing for wireless communication. Meanwhile, the RF circuit 2514 may include for example, a mixer, a filter and an amplifier, and transmits and receives a wireless signal via the antenna 2516. The wireless communication interface 2512 may be a chip module on which the BB processor 2513 and the RF circuit 2514 are integrated. As shown in FIG. 23, the wireless communication interface 2512 may include multiple BB processors 2513 and multiple RF circuits 2514. Although FIG. 23 shows the example in which the wireless communication interface 2512 includes the multiple BB processors 2513 and the multiple RF circuits 2514, the wireless communication interface 2512 may also include a single BB processor 2513 or a single RF circuit 2514.

Furthermore, in addition to the cellular communication scheme, the wireless communication interface 2512 may support another type of wireless communication scheme, such as a short-range wireless communication scheme, a near field communication scheme and a wireless local area network (LAN) scheme. In this case, the wireless communication interface 2512 may include the BB processor 2513 and the RF circuit 2514 for each wireless communication scheme.

Each of the antenna switches 2515 switches a connection destination of the antenna 2516 among multiple circuits (such as circuits for different wireless communication schemes) included in the wireless communication interface 2512.

Each of the antennas 2516 includes a single or multiple antenna elements (such as multiple antenna elements included in an MIMO antenna), and is used for the wireless communication interface 2512 to transmit and receive a wireless signal. The smart phone 2500 may include the multiple antennas 2516, as shown in FIG. 23. Although FIG. 23 illustrates the example in which the smart phone 2500 includes the multiple antennas 2516, the smart phone 2500 may also include a single antenna 2516.

Furthermore, the smart phone 2500 may include the antenna 2516 for each wireless communication scheme. In this case, the antenna switches 2515 may be omitted from the configuration of the smart phone 2500.

The bus 2517 connects the processor 2501, the memory 2502, the storage device 2503, the external connection interface 2504, the camera 2506, the sensor 2507, the microphone 2508, the input device 2509, the display device 2510, the speaker 2511, the wireless communication interface 2512, and the auxiliary controller 2519 to each other. The battery 2518 supplies power to blocks of the smart phone 2500 shown in FIG. 23 via feeder lines, which are partially shown as dashed lines in the Figure. The auxiliary controller 2519 operates a minimum necessary function of the smart phone 2500, for example, in a sleep mode.

In the smart phone 2500 shown in FIG. 23, a transceiver of a device on a user equipment side according to an embodiment of the present disclosure may be implemented by the wireless communication interface 2512. At least a part of functions of the processing circuitry and/or units of the electronic device or the information processing apparatus on the user equipment side according to the embodiments of the present disclosure may also be implemented by the processor 2501 or the auxiliary controller 2519. For example, the auxiliary controller 2519 may perform a part of functions of the processor 2501, to reduce power consumption of the battery 2518. Further, the processor 2501 or the auxiliary controller 2519 may perform at least a part of functions of the processing circuitry and/or the units of the electronic device or the information processing apparatus on the user equipment side according to the embodiments of the present disclosure by executing a program stored in the memory 2502 or the storage device 2503.

[Application Example Regarding Base Station]

Figure 24:
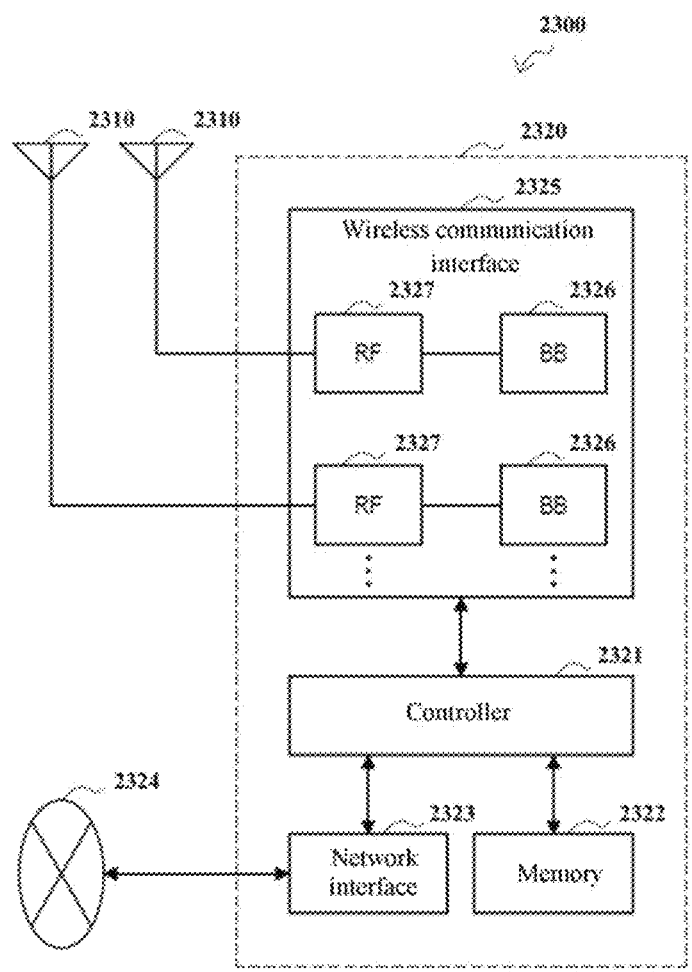
FIG. 24 is a block diagram showing an example of a schematic configuration of a gNB (a base station in a 5G system) to which the technology according to the present disclosure may be applied.

FIG. 24 is a block diagram showing an example of a schematic configuration of a gNB to which the technology according to the present disclosure may be applied. The gNB 2300 includes multiple antennas 2310 and a base station device 2320. The base station device 2320 and each of the antennas 2310 may be connected to each other via a radio frequency (RF) cable.

Each of the antennas 2310 includes single or more antenna elements (such as multiple antenna elements included in a multiple-input multiple-output (MIMO) antenna), and are used for transmitting and receiving a wireless signal by the base station device 2320. As shown in FIG. 24, the gNB 2300 may include multiple antennas 2310. For example, the multiple antennas 2310 may be compatible with multiple frequency bands used by the gNB 2300.

The base station device 2320 includes a controller 2321, a memory 2322, a network interface 2323, and a wireless communication interface 2325.

The controller 2321 may be for example a CPU or a DSP and operate various functions of higher layers of the base station device 2320. For example, the controller 2321 generates a data packet based on data in a signal processed by the wireless communication interface 2325, and transfers the generated packet via a network interface 2323. The controller 2321 may bundle data from multiple baseband processors to generate a bundled packet, and transfer the generated bundled packet. The controller 2321 may have a logic function for performing control such as wireless resource control, wireless carrying control, mobility management, admission control and schedule. The control may be performed in conjunction with an adjacent gNB or a core network node. The memory 2322 includes RAM and ROM, and stores programs executed by the controller 2321 and various types of control data (such as a terminal list, transmission power data and scheduling data).

The network interface 2323 is a communication interface for connecting the base station device 2320 to a core network 2324. The controller 2321 may communication with the core network node or another gNB via the network interface 2323. In this case, the gNB 2300 and the core network node or the other gNB may be connected to each other via a logic interface (such as an S1 interface and an X2 interface). The network interface 2323 may also be a wired communication interface or a wireless communication interface for wireless backhaul line. If the network interface 2323 is a wireless communication interface, the network interface 2323 may use a higher frequency band for wireless communication than a frequency band used by the wireless communication interface 2325.

The wireless communication interface 2325 supports any cellular communication scheme (such as Long Term Evolution (LTE) and LTE-advanced), and provides a wireless connection to a terminal located in a cell of the gNB 2300 via the antenna 2310. The wireless communication interface 2325 usually may include for example a BB processor 2326 and an RF circuit 2327. The BB processor 2326 may perform for example encoding/decoding, modulating/demodulating and multiplexing/de-multiplexing, and perform various types of signal processing of layers (such as L1, medium access control (MAC), radio link control (RLC) and packet data convergence protocol (PDCP)). Instead of the controller 2321, the BB processor 2326 may have a part or all of the above logic functions. The BB processor 2326 may be a memory storing a communication control program, or a module including a processor and a related circuit which are configured to execute programs. Updating programs may change functions of the BB processor 2326. The module may be a card or a blade inserted into a slot of the base station device 2320. Alternatively, the module may be a chip installed on the card or the blade. Meanwhile, the RF circuit 2327 may include for example a mixer, a filter and an amplifier, and transmits and receives a wireless signal via the antenna 2310.

As shown in FIG. 24, the wireless communication interface 2325 may include multiple BB processors 2326. For example, the multiple BB processors 2326 may be compatible with multiple frequency bands used by the gNB 2300. As shown in FIG. 24, the wireless communication interface 2325 may include multiple RF circuits 2327. For example, the multiple RF circuits 2327 may be compatible with the multiple antenna elements. Although FIG. 24 shows an example in which the wireless communication interface 2325 includes the multiple BB processors 2326 and the multiple RF circuits 2327, the wireless communication interface 2325 may also include a single BB processor 2326 and a single RF circuit 2327.

In the gNB 2300 shown in FIG. 24, a transceiver of a wireless communication device on a base station side may be implemented by the wireless communication interface 2325. At least a part of the functions of the processing circuitry and/or various units of the electronic device or the wireless communication device on the base station side may also be implemented by the controller 2321. For example, the controller 2321 may perform at least a part of the functions of the processing circuitry and/or various units of the electronic device or the wireless communication device on the base station side by performing a program stored in the memory 2322.

In the above description of specific embodiments of the present disclosure, features described and/or illustrated for one embodiment may be used in one or more other embodiments in the same or similar manner, or may be combined with features in other embodiments, or may replace features in other embodiments.

It is be noted that, terms "including/comprising" used herein refer to existing of features, elements, steps or components, but existing or adding of one or more other features, elements, steps or components is not excluded.

In the above embodiments and examples, reference numerals consisting of numbers are used to represent steps and/or units. Those skilled in the art should understand that the reference numerals are used to facilitate describing and drawing, and are not intended to indicate an order or limitation in any way.

In addition, the method according to the present disclosure is not limited to be performed in the chronological order described herein, and may be performed in other chronological order, in parallel or independently. Therefore, the order in which the method is performed described herein does not limit the technical scope of the present disclosure.

Although the present disclosure is disclosed by the description of specific embodiments of the present disclosure above, it should be understood that all the embodiments and examples described above are only exemplary but not intended to limit. Various modifications, improvements or equivalents may be made to the present disclosure by those skilled in the art within the scope and spirit of the attached claims. The changes, improvements or equivalents should be regarded as falling within the protection scope of the present disclosure.

The invention claimed is:

1. An electronic device for wireless communication, comprising:
   a transceiver configured to communicate with a user equipment;
   an antenna; and
   processing circuitry configured to:
   perform a first beam scanning;
   determine, based on first measurement information provided by the user equipment with respect to the first beam scanning, a first location range of the user equipment;
   determine, based on the first location range being lower than a predetermined positioning accuracy requirement, an adjustment for a beam configuration based on the first location range so as to form an adjusted beam configuration;
   perform a second beam scanning; and
   determine, based on second measurement information provided by the user equipment with respect to the second beam scanning and performed by the user equipment utilizing the adjusted beam configuration, a second location range of the user equipment.

2. The electronic device according to claim 1, wherein the beam configuration at least comprises one of a beam direction or a beam width.

3. The electronic device according to claim 1, wherein the processing circuitry is further configured to:
   determine a first set of transmit/receive ports of a wireless access point, for performing the first beam scanning based on a first beam configuration, the first set of transmit/receive ports comprising one or more receive/transmit port circuits; and
   determine a second set of transmit/receive ports of a wireless access point based on the first measurement information, for performing the second beam scanning based on a second beam configuration, the second set of transmit/receive ports comprising one or more receive/transmit port circuits.

4. The electronic device according to claim 3, wherein
   determining the first set of transmit/receive ports comprises:
   determining, as the first set of transmit/receive ports, transmit/receive ports of a wireless access point adjacent to a main wireless access point of a cell where the user equipment is located; or
   determining, according to signal strength of an uplink signal transmitted by the user equipment which is received by transmit/receive ports of a wireless access point, transmit/receive ports with high signal strength as the first set of transmit/receive ports,
   determining the second set of transmit/receive ports comprises:
   determining, as the second set of transmit/receive ports, transmit/receive ports of a wireless access point adjacent to the first location range of the user equipment; or
   determining, according to signal strength of an uplink signal transmitted by the user equipment which is received by transmit/receive ports of a wireless access point, transmit/receive ports with high signal strength as the second set of transmit/receive ports.

5. The electronic device according to claim 3, wherein the first set of transmit/receive ports is a selected initial set of transmit/receive ports, and the processing circuitry is configured to: perform control to receive measurement information of the user equipment with respect to the beam corresponding to the maximum receiving power in the initial set of transmit/receive ports, determine the first location range according to the initial set of transmit/receive ports, and improve an accuracy of a positioned location of the user equipment by defining a location range.

6. The electronic device according to claim 1, wherein the processing circuitry is further configured to:

perform another adjustment for the beam configuration in a case where the second location range does not satisfy the predetermined positioning accuracy requirement.

7. The electronic device according to claim 1, wherein whether or not the first location range or the second location range satisfies the predetermined positioning accuracy requirement is determined based on one or more of the following conditions:

the maximum deviation of the first location range or the second location range is less than a location deviation under the predetermined positioning accuracy requirement;

an area of the first location range or the second location range is less than a location uncertainty area under the predetermined positioning accuracy requirement; and a weighted average location deviation in respective directions of the first location range or the second location range is less than a weighted average location deviation under the predetermined positioning accuracy requirement.

8. The electronic device according to claim 1, wherein the determination of the first location range or the second location range is based on:

an transmitting angle of a strongest beam received by the user equipment; or both the transmitting angle of the strongest beam and a receiving power of the strongest beam.

9. The electronic device according to claim 1, wherein the first measurement information and the second measurement information comprise:

information about a beam with a maximum receiving power determined by the user equipment by means of measuring receiving power of each beam in the corresponding beam scanning.

10. The electronic device according to claim 1, wherein the adjustment for the beam configuration comprises:

adjusting a beam direction so that adjacent beams divide the first location range;

making two adjacent adjusted beams bisect the first location range; or minimizing the maximum area in all sub-regions after the first location range is divided by adjusted beams.

11. The electronic device according to claim 10, wherein the adjustment for the beam configuration comprises:

adjusting the beam direction and a beam width so that the adjacent adjusted beams cover the first location range.

12. The electronic device according to claim 10, wherein the second measurement information comprises:

information about a beam with a maximum receiving power determined by the user equipment measuring at least two adjacent adjusted beams.

13. The electronic device according to claim 1, wherein the electronic device is provided on a base station side.

14. The electronic device according to claim 1, wherein the electronic device comprises a location management function (LMF).

15. An electronic device for wireless communication, comprising:

a transceiver configured to communicate with a base station;

an antenna; and processing circuitry configured to:

perform control to measure a first beam scanning of the base station to obtain first measurement information, and transmit the first measurement information to the base station, the first measurement information being used by the base station to determine a first location range of the electronic device; and perform control to measure a second beam scanning of the base station using an adjusted beam configuration to obtain second measurement information, and transmit the second measurement information to the base station, the second measurement information being used by the base station to determine a second location range of the electronic device, wherein the adjusted beam configuration is determined by the base station based on the first location range.

16. The electronic device according to claim 15, the electronic device comprises a user equipment.

17. A wireless communication method, comprising:

measuring a first beam scanning of a base station to obtain first measurement information, and transmitting the first measurement information to the base station, the first measurement information being used by the base station to determine a first location range of an electronic device; and measuring a second beam scanning of the base station using an adjusted beam configuration to obtain second measurement information, and transmitting the second measurement information to the base station, the second measurement information being used by the base station to determine a second location range of the electronic device, wherein the adjusted beam configuration is determined by the base station based on the first location range.

* * * * *